(12) United States Patent
Galdes et al.

(10) Patent No.: US 6,177,932 B1
(45) Date of Patent: Jan. 23, 2001

(54) METHOD AND APPARATUS FOR NETWORK BASED CUSTOMER SERVICE

(75) Inventors: Frank A. Galdes, Menlo Park; Mark A. Ericson, Redwood City, both of CA (US)

(73) Assignee: Kana Communications, Inc., Redwood City, CA (US)

( * ) Notice: Under 35 U.S.C. 154(b), the term of this patent shall be extended for 0 days.

(21) Appl. No.: 09/137,989

(22) Filed: Aug. 21, 1998

(51) Int. Cl.[7] .............................. G06F 3/14; G06F 17/30
(52) U.S. Cl. ................... 345/329; 707/200; 705/1
(58) Field of Search ............... 707/1–10, 100–104, 707/200–206; 345/326–329, 333; 709/200–253

(56) References Cited

U.S. PATENT DOCUMENTS

| | | | |
|---|---|---|---|
| 5,796,393 | * 8/1998 | MacNaughton et al. | 345/329 |
| 5,950,214 | * 9/1999 | Rivette et al. | 707/512 |

OTHER PUBLICATIONS

A. Paepcke, H. Garcia–Molina, G. Rodriguez–Mula and J. Cho, "Beyond Document Similarity: Understanding Value–Based Search and Browsing Technologies", Internet paper, downloaded from www–dialib.standard.edu/digilib/wp/public/doc 238.pdf.created Oct. 24, 1998, pp. 1–20.

Shoshana Loeb and Douglas Terry, "Information Filtering", Communications of the ACM, Dec. 1992, pp. 26–28.

Paul Resnick and Hal R. Varian, "Recommender Systems", Communications of the ACM, Mar., 1997, pp. 56–58.

W. Hill, B. Amento, D. McDonald, L. Terveen and J. Creter, PHOAKS: A System for Sharing Recommendations, Communications of the ACM, Mar., 1997, pp. 59–62.

Marti A. Hearst, TileBars: Visualization of Term Distribution Information in Full Text Information Access, Human Factors in Computing Systems, CHT'95 Conference Proceeding, 1995, pp. 59–66.

B. Kessler, G. Nunberg and H. Schuetze, "Automatic Detection of Text Genre", In Proceedings ACL/EACL, Jul. 8, 1997. 8 pages.

Sergey Brin, "Extracting Patterns and Relations from the World Wide Web", in WebDB Workshop at 6th International Conference of Extending Database Technology, EDBT'98, 1998, available at http:/ /www–db.stanford.edu/sergey/extract.ps, 12 pages.

Sergey Brin and Lawrence Page, "The Anatomy of a Large–Scale Hypertextual Web Search Engine", In Proceedings of the Seventh World–Wide Web Conference, 1998, pp. 1–17.

J. Cho, H. Garcia–Molina and L. Page, "Efficient Crawling Through URL Ordering", http:/ /www–db.stanford.edu /—cho/crawler–paper/, pp. 1–21.

H. Kautz, B. Selman and M. Shah, "Referral Web: Combining Social Networks and Collaborative Filtering", Communications of the ACM, Mar., 1997, pp. 63–65.

(List continued on next page.)

*Primary Examiner*—Ruay Lian Ho
(74) *Attorney, Agent, or Firm*—Stattler Johansen & Adeli LLP

(57) ABSTRACT

A method and apparatus for a network based customer service is provided. In response to a client requesting help, a menu including three levels of interaction is displayed. One level of interaction is self-help searching in a database of information. A second level of interaction is asynchronous help, requesting help and receiving a reply. The third level of interaction is synchronous help, interaction with an advisor. If the client selects synchronous help, the method includes the steps of alerting the advisor and displaying a list of previously visited sites by the client to the advisor. The synchronous help method further includes providing a synchronized display between the client and the advisor, such that the advisor sees an identical display to the client.

19 Claims, 8 Drawing Sheets

OTHER PUBLICATIONS

D. R. Cutting, D. R. Karger, J. O. Pedersen and J. W. Tukey, "Scatter/Gather: A Cluster–based Approach to Browsing Large Document Collections", Proceedings of the Fifteenth Annual International ACM SIGIR Conference on Research and Development in Information Retrieval, pp. 318–329.

M. Sahami, S. Yusufali and M. Q. W. Baldonado, "SONIA: A Service for Organizing Net–worked Information Autonomously", Proceedings of the Third ACM International Conference on Digital Libraries, 1998, pp. 200–209.

M. Q. W. Baldonado and T. Winograd, "SenseMaker: An Information–Exploration Interface Supporting the Contextual Evolution of a User's Interests", Proceedings of the Conference on Human Factors in Computing Systems, ACM Press, New York, Atlanta, GA., Mar., 1997, pp. 11–18.

M. A. Stairmand, "Textual Content Analysis for Information Retrieval", Procedings of the Twentieth Annual International ACM SIGIR Conference on Research and Development in Information Retrieval, 1997, pp. 140–147.

P. Resnick and J. Miller, "PICS: Internet Access Controls Without Censorship", Communications of the ACM, 39(10) 1996, pp. 87–93.

Eric Miller, "An Introduction to the Resource Description Framework", D–Lib Magazine, May 1998, http:/ /www.dli-b.org/dlib/may 98/miller/05miller.html, pp. 1–12.

Resource Description Framework (RDF) Model and Syntax Specification, W3C Working Draft Oct. 8, 1998, available at http: / /www.w3.org/TR/WD–rdf–syntax/, pp. 1–48.

N. J. Belkin and W. Bruce Croft, "Information Filtering and Information Retrieval: Two Sides of Same Coin?", Communications of the ACM, 35(12) Dec., 1992, pp. 29–38.

D. Goldberg, D. Nichols, B. M. Oki and D. Terry, "Using Collaborative Filtering to Weave an Information Tapestry", Communications of the ACM, Dec. 1992, pp. 61–70.

M. Balabanovic and Y. Shoham, "Fab: Conten–Based Collaborative Recommendation", Communications of the ACM, Mar. 1997, pp. 66–72.

J. A. Konstan, B. N. Miller, D. Maltz, J. L. Herlocker, L. R. Gordon, and J. Riedl, "GroupLens: Applying Collaborative Filtering to Unsenet News", Communications of the ACM, Mar. 1997, pp. 77–87.

T. W. Malone, K. R. Grant, K. Y. Lai, R. Rao and D. Rosenblitt, "Semistructured Messages are Surprisingly Useful for Computer–Supported Coordination", ACM Transactins on Information Systems, Apr. 1987, pp. 115–131.

T. Yan amd H. Garcia–Molina, "SIFT—A Tool for Wide–Area Information Deissemination", 1995 USENIX Technical Conference, pp. 177–186, http:/ /sift.stanford.edu.

S. Loeb, "Architecting Personalized Delivery of Multimedia Information", Communicatins of the ACM, Dec. 1992, pp. 39–48.

T. Joachims, D. Freitag, and T. Mitchell, "WebWatcher: A Tour Guide for the World Wide Web", Proceedings of The Fifteenth Int'l Joint Conference on Artificial Intelligence, Aug. 1997, pp. 770–775.

T. W. Yan, M. Jacobsen, H. Garcia–Molina and U. Dayal, "From User Access Patters to Dynamic HypertextLinking", Proceedings of the Fifth Int'l World Wide Web Conference, May 1996, pp. 1–10.

H. Garcia–Molina, G. Rodriguez and A. Paepcke "Collaborative Value Filtering on the Web", Stanford Digital Library Project, SIDL–WP–1998–0084, available at www–diglib.stanford.edu/cgi–bin/WP/get/SIDL–WP–1998–0084.

M. Morita and Y. Shinoda, "Information Filtering Based on User Behavior Analysis and Best Match Text Retrieval", Proceedings of the Seventeenth Annual International ACM SIGIR Conference on Research and Development in Information Retrieval, 1994, 272–281.

J. Rucker and M. J. Polanco, "Siteseer: Personalized Navigation for the Web", Communications of the ACM, 40(3), Mar. 1997, pp. 73–75.

H. Lieberman, "Letizia: An Agent that Assists Web Browsing", Proceedings of 14th International Joint Conference on Artificial Intelligence, 1995, pp. 924–929.

Motive Technologies brochure, 1998 Motive Communications, 3 pages, http:/ /www.motive.com/Product Forum/technology.html.

* cited by examiner

METHOD AND APPARATUS FOR NETWORK BASED CUSTOMER SERVICE

FIELD OF THE INVENTION

The present invention relates to customer service, and more specifically, to network based customer service.

BACKGROUND

A recent business trend is to reduce help desk traffic by promoting the Internet as a way for customers, and individuals within a corporation, to access information. The Internet is particularly suited for this because of its global reach and relatively easy accessibility.

One prior art method of providing customer service is by posting a question in a Question and Answer (Q&A) list, and waiting until either service personnel or other customers provide an answer by posting it to the same Q&A list. The answer may or may not be correct.

Another prior art Internet based customer service solution is posting a large "frequently asked questions" (FAQ) list that answers most typical questions.

While using the Internet reduces costs, for most prior art systems it reduces customer satisfaction. The customer does not feel that he or she is receiving individual attention. Furthermore, there is no assurance that the answer is correct for the specific situation in which the customer finds himself or herself.

One prior art method of providing more interactive customer service on the Internet is a web based help-desk. The customer logs on to a "help page," that is separate from the area in which the customer had trouble. The customer then fills out a help request, including answering a series of questions regarding the problem. While the customer is connected to this help page on the Internet, the customer's computer system sends configuration information to service technicians. The service technicians evaluate the data from the computer and the help request. The service technicians then call the customer to discuss the problem.

However, this requires the same amount of help desk traffic as a direct 800 number help desk. Additionally, filling out the help request is a chore that takes considerable time. Furthermore, some customers do not like having the contents of their personal computers surveyed, especially if at least some sections of that computer are not relevant to the problem, and contain private information. In addition, the customer must leave the web page on which he or she encountered the problem to log on to the help page to start this help process. This interrupts normal work, and is a hassle.

SUMMARY OF THE INVENTION

A method and apparatus for improving network based customer service is as follows. In response to a client requesting help, a menu including three levels of interaction is displayed. One level of interaction is self-help searching in a database of information. A second level of interaction is asynchronous help, requesting help and receiving a reply. The third level of interaction is synchronous help, interaction with an advisor. If the client selects synchronous help, the method includes the steps of alerting the advisor and displaying a list of previously visited sites by the client to the advisor. The synchronous help method further includes providing a synchronized display between the client and the advisor, such that the advisor sees an identical display to the client.

This method offers several advantages over the prior art. It allows the client to receive help from an advisor without leaving the web page on which a problem occurred. It enables a client to send information helping the selection of a solution or selection of an advisor able to determine a solution. It enables the advisor to see customer information and web context information that may assist an advisor in finding a solution. It provides the advisor a synchronized display with the client, so that the client can clearly demonstrate the problem to the advisor.

These and other objects, features, and advantages of present invention will be apparent from the company drawings and from the following detailed description.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a network based customer service is described. As more and more information becomes available through a network such as the Internet, LAN, WAN or similar network, customer service should improve commensurably. A network based customer service, that allows a company to provide services in a faster and more organized matter, is advantageous.

Figure 1:
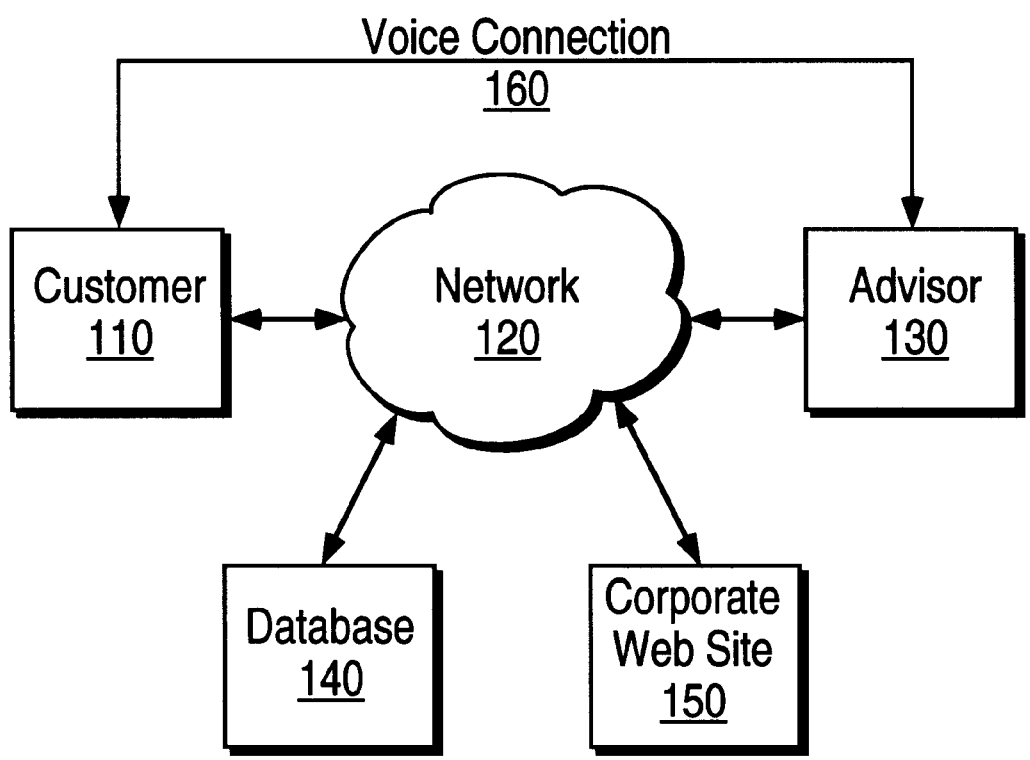
FIG. 1 illustrates one embodiment of a network including a client and server system.

FIG. 1 illustrates a network including a client and server system. A customer 110 is coupled to a network 120. The network 120 may be the Internet, a LAN, a WAN, or a similar network 120. The customer 110 has access to a database 140 and corporate web site 150 through the network 120. The corporate web site 150 may implement a help system as described below. Alternatively the customer's system 110 may implement the help system.

An advisor 130 may be coupled to the network 120. The advisor 130 may be a customer service representative, another customer, an automated system, or any other mechanism that provides help to the customer 110. For one embodiment, the advisor 130 is not always coupled to the network 120. Furthermore, a voice connection 160 may be established between the customer 110 and the advisor 130, when the customer 110 requests help, as will be described below. For one embodiment, the voice connection 160 is established through a conventional telephone system. Alternatively, the voice connection 160 may be established through the network 120, or through some other means, such as satellite. The customer 110 can browse a number of sites through the network 120. If the customer 110 requests help a connection is established between the customer 110 and the advisor 130.

Figure 2:
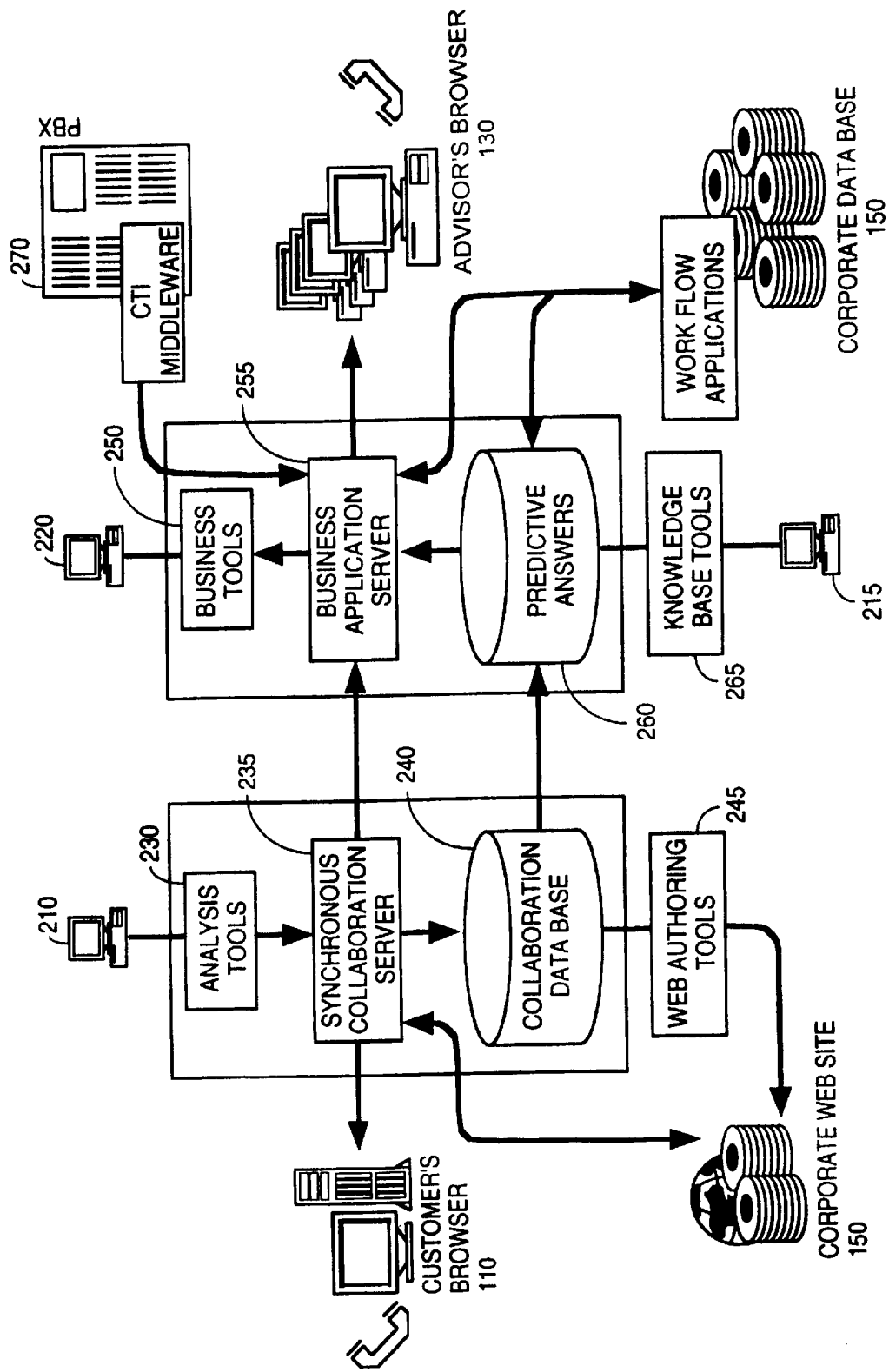
FIG. 2 illustrates one embodiment of a server system in which the present invention may be implemented.

FIG. 2 illustrates one embodiment of a server system in which the present invention may be implemented. For this embodiment, the help system (not shown) is implemented in a client-server system.

Figure 3:
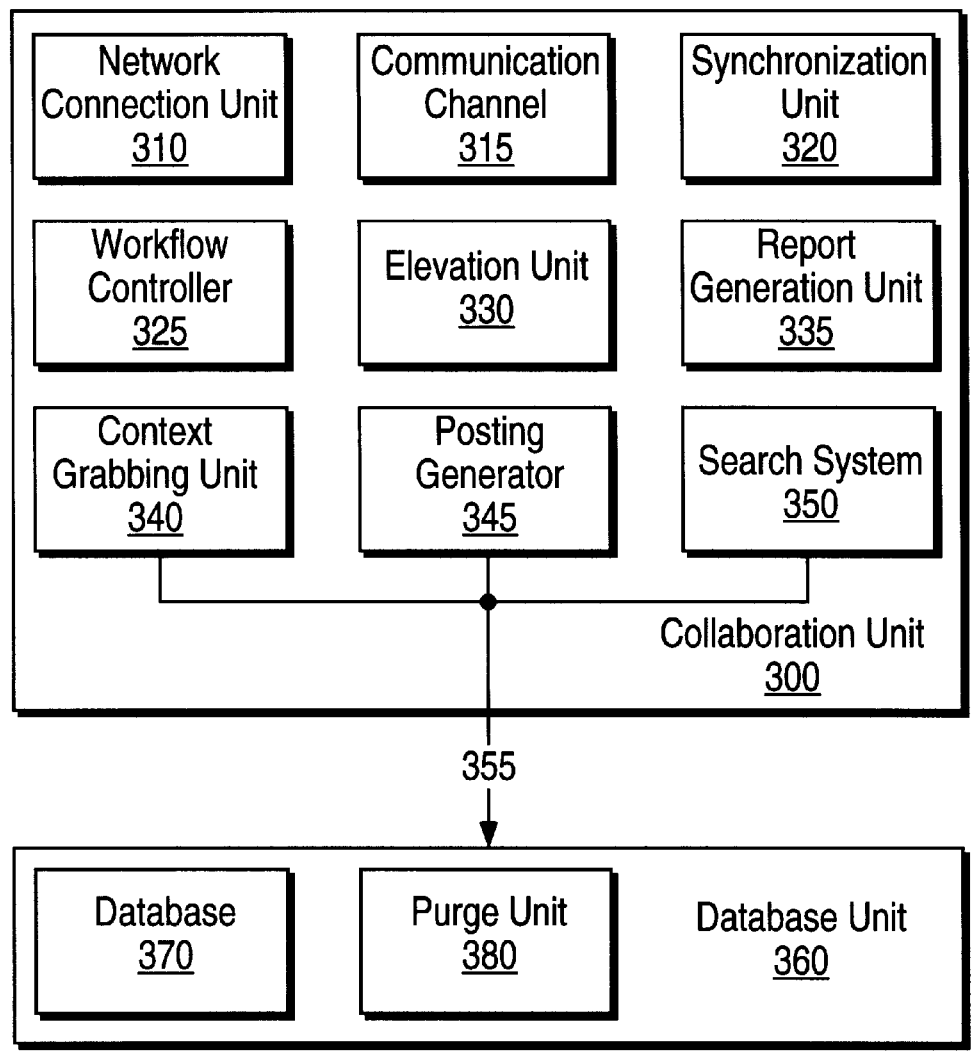
FIG. 3 illustrates one embodiment of a help system block diagram.

FIG. 3 illustrates a block diagram of one embodiment of a help system. The collaboration unit 300 is located on a server, and permits the advisor to respond to customer help requests. For one embodiment, the collaboration unit 300 is located on the advisor's system. A database unit 360 is located on a server (not shown). For one embodiment, the database unit is located on the same server as the collaboration unit 300. For another embodiment, the database unit 360 is coupled to the collaboration unit 300 through a network connection 355.

The collaboration unit 300 includes a network connection unit 310, permitting the collaboration unit 300 to interact with a customer. For another embodiment, the collaboration unit 300 also interfaces with the database unit 360 through the network connection unit 310.

The collaboration unit 300 further includes a communication channel 315. For one embodiment, the communication channel 315 includes a digital connection for text, images, video, etc. and a voice channel. For another embodiment, the communication channel 315 is established through the network connection unit 310.

The collaboration unit 300 further includes a workflow controller 325. The workflow controller 325 controls what cases are routed to each advisor. The workflow controller 325 also tracks the actions of the advisor and opens closes cases. For one embodiment, the workflow controller 325 is a single system that controls workflow to all of the advisors.

When a new case is opened by the workflow controller 325, the context grabbing unit 340 collects context information from the customer's system, to aid the advisor in helping the customer. Context information includes the web tracks of the customer, the locations he or she visited prior to asking for help. For one embodiment, the web tracks also include the actions of the customer at the prior locations. For one embodiment, the context may further include customer history. Customer history, for one embodiment, includes previous questions asked by the customer as well as personal information about the customer. All of this information may be used by the advisor to help the customer.

The collaboration unit 300 further may include a synchronization unit 320. For one embodiment, after a case is opened to respond to a help request, the advisor establishes a connection with the customer through the communication channel 315. For one embodiment, the advisor may also walk the customer through a web page to answer the customer's questions. The synchronization unit 320 allows the customer's and advisor's browsers to display the same text and images at the same time.

The collaboration unit 300 further includes a search system 350, that permits the advisor to search a database to answer the customer's question. The data may be in a data unit 370 of the database unit 360. For one embodiment, if the advisor does not know the answer to the customer's help request, the search system 350 is automatically engaged to find an answer. For one embodiment, if the advisor can not answer with the help of the search system 350, an elevation unit 330 elevates the customer's help request. The elevation unit 330 collects the context information gathered by the context grabbing unit 340, and the information about the collaborative session collected by the workflow controller 325, and passes them to a second advisor. For one embodiment, the second advisor may be a manager or a technical specialist.

The posting generator 345 may be used if an answer is found to the customer's help request. A posting generator 345 allows the advisor to "stick" a posting to a web page discussed with the customer. The posting may include text, audio information, video, etc. This posting is associated with the specific web page for the customer. For one embodiment, the posting is persistent and appears on the web page every time the customer opens that web page, or until the customer closes the posting. For one embodiment, the postings generated by the posting generator 345 are stored in the database unit 360, not on the customer's computer system.

A report generation unit 335 may be used to generate a report on a specific case, or on some or all of the cases handled by the collaboration unit 300. For one embodiment, the report generation unit 335 automatically generates reports. Some reports, for example are: the number of questions answered by an advisor, the number of questions asked about any one location, the percentage of customers who asked questions, etc.

The database unit 360 includes a database 370 that is searched by the search system 350. The database 370 includes past postings and contexts. The database 370 may further include a help file, a frequently asked questions (FAQ), or other data. The database unit 360 may further include a purge unit 380. The purge unit 380 may purge data in the data unit 370 if the data was not used for a long time. For one embodiment, if a datrem in the database 370 is not accessed for a period of time, it is purged. For example, the data may include an expiration date that is refreshed every time an access to the data is made. In this way, unused data is purged. For another embodiment, the purge unit 380 purges data relating to pages that are no longer available.

Figure 4:
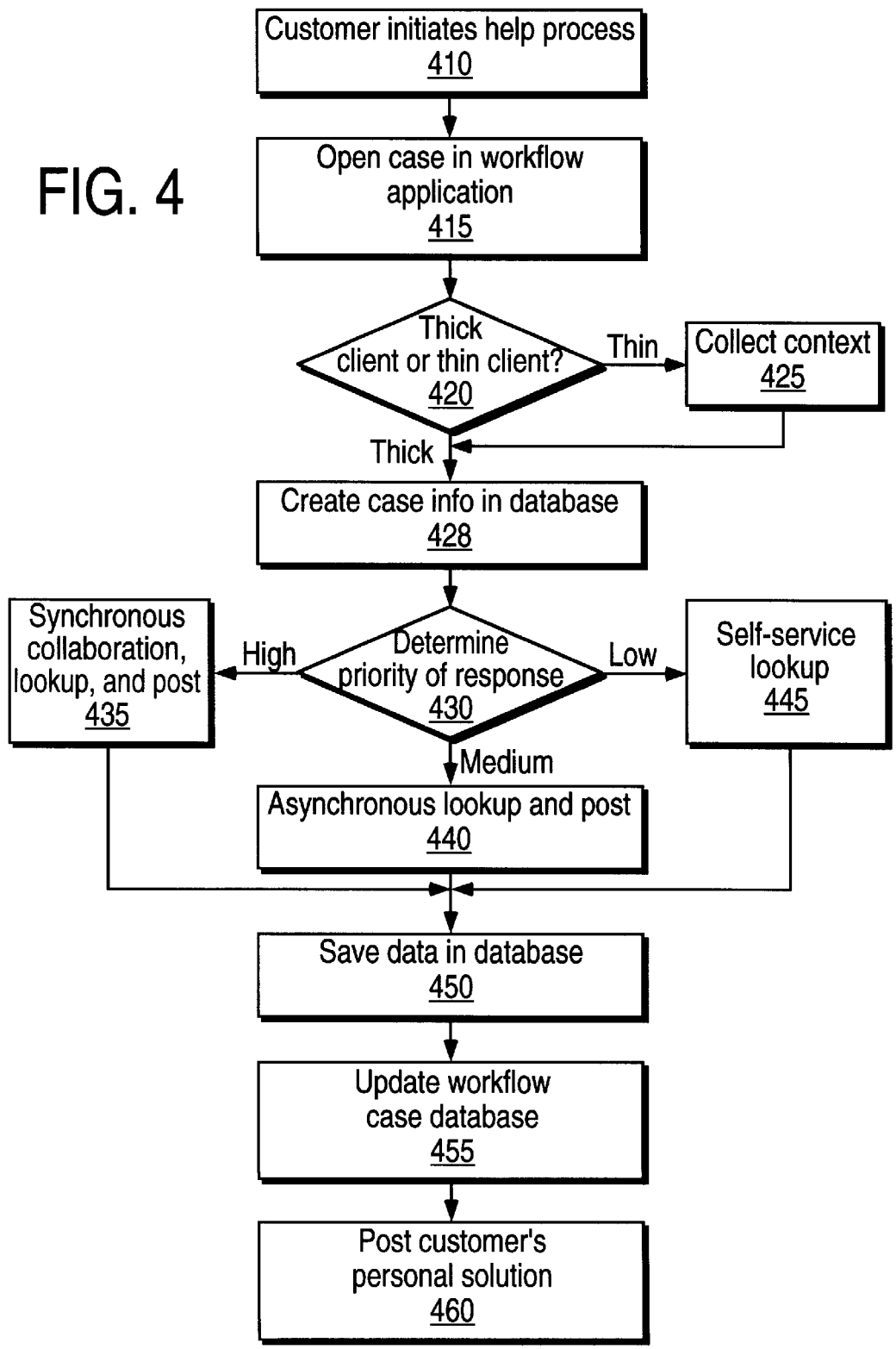
FIG. 4 illustrates one embodiment of an overview flow chart of the collaborative process.

FIGS. 4–7 illustrate flow charts of one embodiment of the operation of the present invention. FIG. 4 illustrates an overview of the collaboration process.

At block 410, the customer indicates that he or she needs help. For one embodiment, the help form is accessible from a web page on which the customer has questions. For one embodiment, there is an icon on a web page indicating that the customer can get help. When the customer clicks on that icon, a help request form is displayed, which the customer then completes. For another embodiment, the customer's system dynamically overlay a help button over the web page. For yet another embodiment, the customer submits his or her help request via e-mail, telephone, or another method. If the help request is not submitted in an electronic form, it may be converted into an electronic query automatically or manually.

At block 415, a case is opened in a workflow system. The workflow system is on a server that receives the help request. In response to receiving a help request, a case is opened. For one embodiment, the case includes the identity of the customer, the customer's specific question, and other information. For another embodiment, the other information may include a history of previous questions from the same customer, information about the skill level of the customer, and any further available information that improves a interaction between the customer and the customer service system.

At block 420, the process tests whether the customer is using a thin client or a thick client. A thick client is a system that automatically collects all relevant information from the customer. A thin client may only collect the customer's identity. For one embodiment, if the help request was received through an e-mail request, telephonic request, or by another means, the client is designated as a thin client.

If the customer is using a thick client, relevant information is automatically collected by the system. If the customer is using a thin client, the process continues to block 425. At block 425, context is collected. The process then continues to block 430. If a thick client was used, the process continues directly from block 420 to block 430.

At block 430, the process queries to determine the priority of response. The customer may indicate a number of possible priorities. For one embodiment, the priorities are high, medium, and low.

If low priority was selected, the process continues to block 445, and a self-service lookup is initiated. The self-service lookup is described in more detail with respect to FIG. 5.

If medium priority was selected, the process continues to block 440, and an asynchronous collaboration is initiated. Asynchronous collaboration is described in more detail with respect to FIG. 6.

If high priority was selected, the process continues to block 435, and a synchronous collaboration is initiated. Synchronous collaboration is described in more detail with respect to FIG. 7.

Each of the types of responses, synchronous collaboration at block 435, asynchronous collaboration at block 440, and self-help lookup at block 445, continue to block 450.

At block 450, data is saved in a database 450. The database 450 is available to the advisor, and may be available to the customer, for searching. The data saved in the database 450 enables a second advisor to determine what the question and the answer were. The database 450 is used to provide consistent answers, and enhance searching for an answer.

At block 455, the workflow case database is updated. This update indicates how the customer's question was disposed of, and that the case was completed. For one embodiment, the information is entered by the advisor. Alternatively, the process may automatically determine the disposal of the case, and update the database.

At block 460, the customer's personal solution, determined during the session at block 435, 440, or 445, is posted. This solution is now available to the customer persistently. The answer is also available to other customers through the database.

Figure 5:
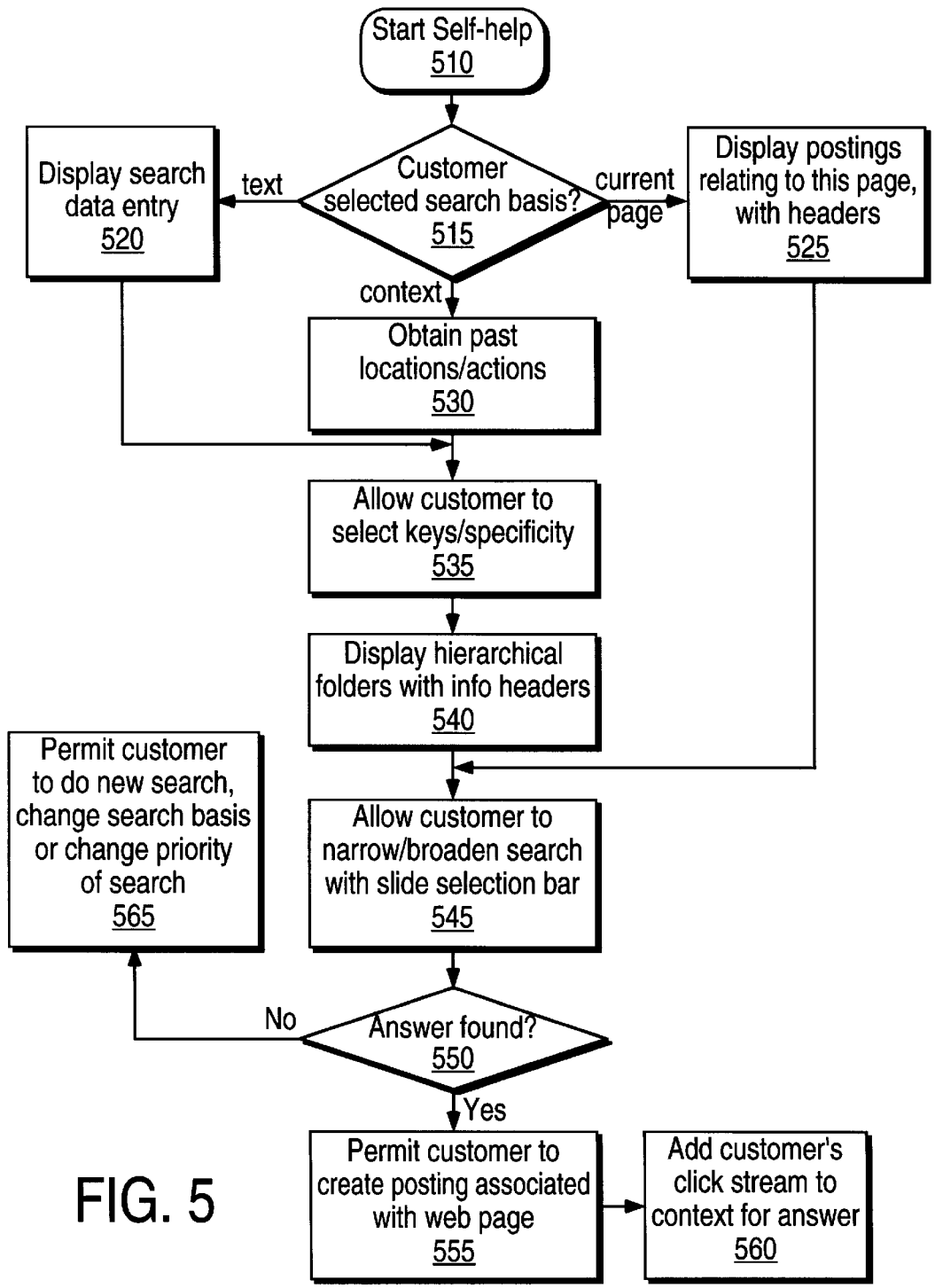
FIG. 5 illustrates one embodiment of a flowchart illustrating a self-help search.

FIG. 5 illustrates one embodiment of the process of self-service lookup. At block 510, the self-service lookup is initiated. For one embodiment, the self-service lookup is initiated in response to a customer posting a low priority help request.

At block 515, the process tests whether the customer has selected a search basis. For one embodiment, the type of search used depends on the search basis. For one embodiment, the search basis may include:
keywords, i.e. a text search,
context, a current location from which the help was requested,
structured search, i.e. searching through a tree.

One of these search bases may be selected. Alternatively, a combination of one or more of these search bases may be selected, for example a context based search further refined using keywords.

For another embodiment, this step may be skipped and the process may automatically select the search type. For another embodiment, a combination of one or more of the search bases may be used for the search.

If the customer selects a text search, the process continues to block 520. At block 520, a search data entry block is displayed, allowing the customer to type in a search. For one embodiment, the search is a Boolean search, allowing a complex query. For another embodiment, the text search is an English search that allows the customer to type in a query in normal English, and the search engine parses the query to obtain search terms. Alternative ways of searching are known in the art and may be used. When the customer enters the query, the process continues to block 535.

If the customer selects a "current page" based search, the process continues to block 525. At block 525, postings relating to the current page from which the customer requested help are displayed. For one embodiment, the postings are displayed with headers indicating the topic of the posting, allowing the customer to select postings that may be relevant to the customer's question. For one embodiment, the process then continues to block 545. Alternatively, if there are too many postings associated with the page, the process may continue to block 535.

If the customer selects a "context based" search, the process continues to block 530. At block 530, the process obtains the customer's web tracks. The web tracks, for one embodiment, include past locations, i.e. what web pages the customer visited prior to asking for help. The web tracks may further the actions of the customer at each of the previous sites. For one embodiment, the web tracks include only those sites and actions that are relevant. Thus, for example, if prior to starting the process leading to the current question, the customer visited other sites, such as a search engine, web store, bank, etc., that information is not collected. The process then continues to block 535.

At block 535, the customer is allowed to select keys/specificity. The customer may, at this point, select how closely the context, text, or page location of the customer has to match the data associated with the postings to be displayed. For one embodiment, this block may be left out of the process. For another embodiment, this block is selectively included in the process if the number of postings found otherwise is excessive.

At block 540, a set of hierarchical folders is displayed with headers indicating the type of postings included in each of the folders. For another embodiment, an alternative means of display may be used.

Figure 8:
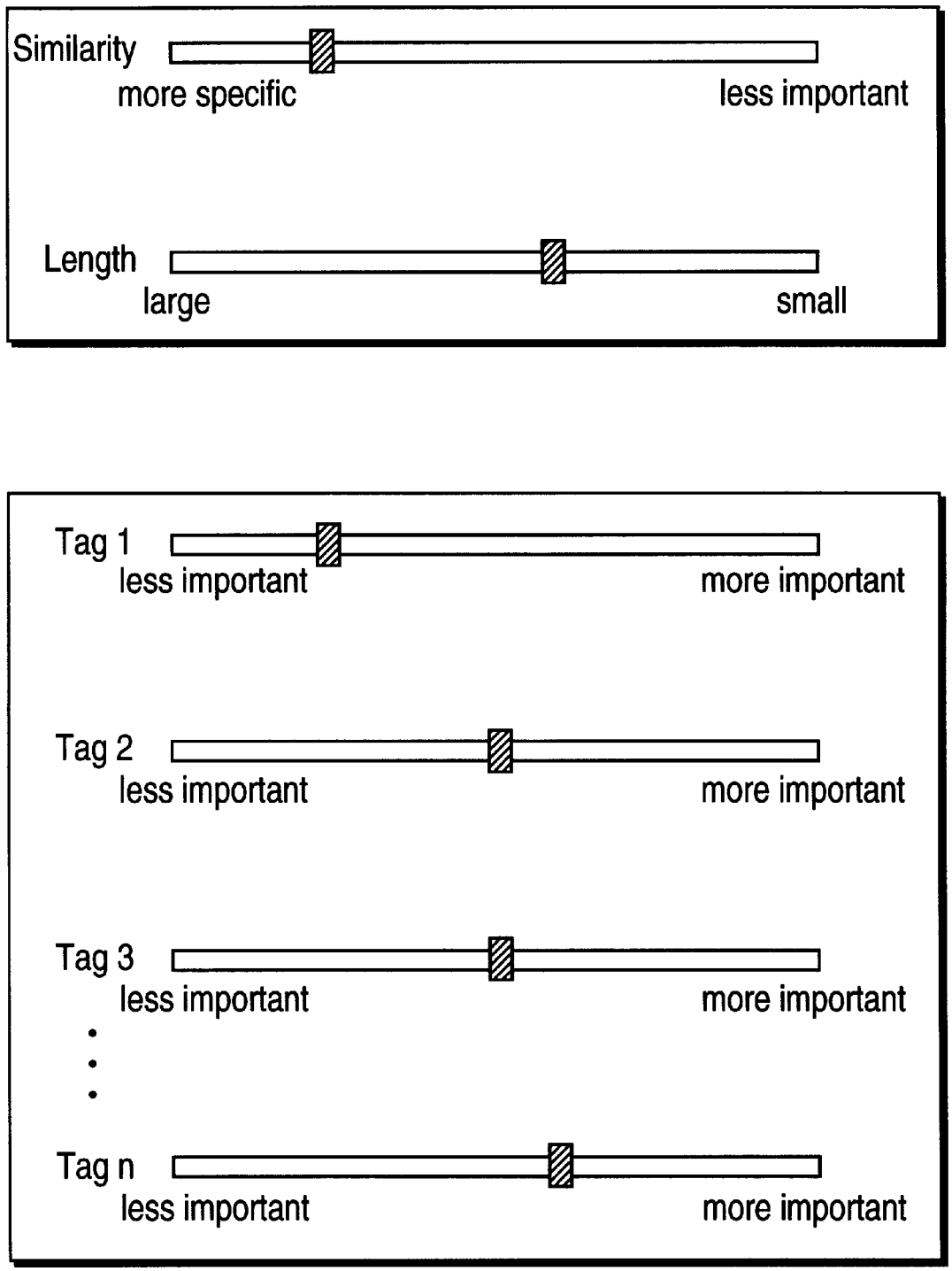
FIG. 8 illustrates one embodiment of slider bars.

At block 545, the customer is allowed to narrow or broaden the search. For one embodiment, the customer changes the scope of the search using slide selection bars. One embodiment of bars are illustrated in FIG. 8.

At block 550, the process determines whether the customer has found an answer. For one embodiment, the customer may indicate that he or she has found an answer by pushing an "answer found" button, or the process may determine in some other way that the customer has found the answer.

If the answer was not found, the process continues to block 565. At block 565, the customer is permitted to execute a new search or change the search basis. For one embodiment, the customer is also allowed to change the priority of the help request, thereby requesting another type of help. Thus, customer may decide that he or she can not obtain an answer using selfhelp, and may request asynchronous or synchronous help.

If the answer was found at block 550, the process continues to block 555. At block 555, the customer may create a posting associated with the web page. This posting may clarify the answer the customer has found. This posting is useful for the customer, since it is persistent and remains associated with the web page for this customer. For another embodiment, an electronic agent may push relevant information onto the customer's computer system. For one embodiment, push technology is used. For another embodiment, relevant information tagged by the customer is saved to the customer's system using another method.

At block 560, the customer's click stream, or web tracks, are added to the context for the answer. Thus, the context gathered during this interaction is added to the context of the answer in the database. For one embodiment, the search text may also be added to the context for the answer. Adding this information to the context simplifies the search procedure for the next customer who has a similar query.

For another embodiment, the self-help process may be simplified. In that instance, the context-based search is automatically selected. The process then determines an answer, and an electronic agent pushes the answer to the customer's system. This methodology does not require customer interaction with the help system. The process described with respect to FIG. 5 is used, but all decisions indicated to be made by the customer are automated. For one embodiment, the customer can select this type of self-help. For another embodiment, based on customer information, i.e. if the customer is inexperienced with computers, the system may automatically select this agent based self-help method.

Figure 6:
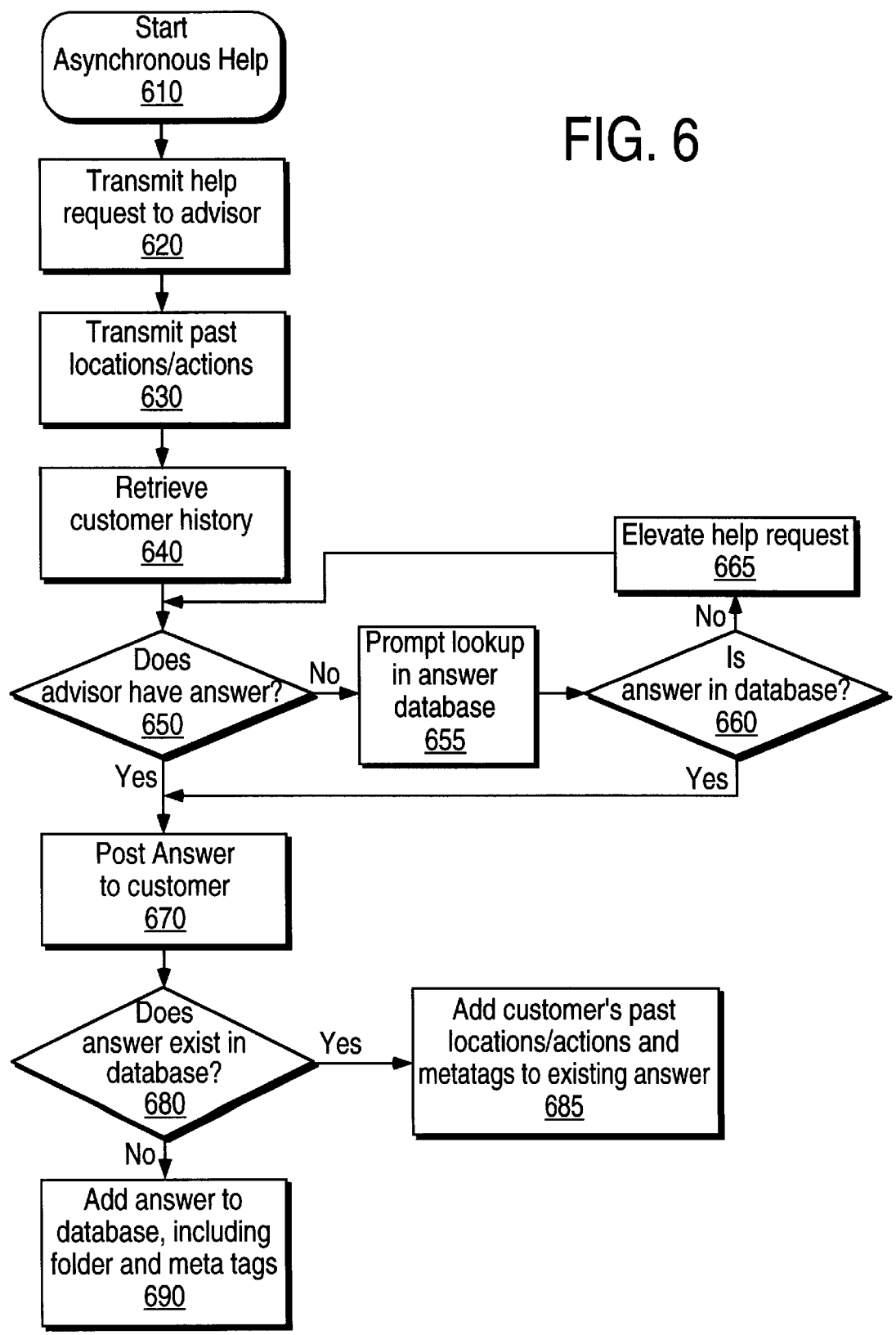
FIG. 6 illustrates one embodiment of a flowchart of asynchronous help.

FIG. 6 illustrates the process of asynchronous collaboration. Asynchronous collaboration permits the customer to post a help query. The help query is answered by an advisor at a later time, and the response is posted to the customer. The customer can then access the answer. This process takes place asynchronously. For one embodiment, asynchronous help generally posts responses to a help query within 24 hours.

At block 610, the asynchronous collaboration is initiated. For one embodiment, the asynchronous collaboration is initiated in response to a customer posting a medium priority help request.

At block 620, the help request is transmitted to an advisor. For one embodiment, the advisor may be a customer service representative. For another embodiment, the advisor may be an artificial intelligence. For yet another embodiment, the advisor may be another customer.

At block 630, the web tracks of the customer requesting help are transmitted to the advisor. As described above, the web tracks may include past locations and past actions of the customer.

At block 640, the customer's history is retrieved. For one embodiment, the customer's history may include previous help requests. For another embodiment, the customer's history may include the customer's previous actions with respect to this help request. Thus, for example, if the customer initially did a self-help search, this information is transmitted to the advisor.

At block 650, the process tests whether the advisor has an answer for the customer's request. The advisor may have more experience than the customer, and may be able to obtain an answer without searching. If the has an answer, the process continues to block 670, otherwise, the process continues to block 655.

At block 655, the advisor is prompted to look up the help request in an answer database. The answer database search for the advisor is similar to the search for the self-help, as discussed with respect to FIG. 5. For one embodiment, the advisor is also able to use a more command-oriented interface for more in-depth searching.

At block 660, the process tests whether the answer was found in the database. For one embodiment, the advisor indicates whether the answer was found by selecting the answer or selecting a "no answer found" button.

If an answer was found, the process continues to block 670. If no answer was found, the process continues to block 665. At block 665, the advisor elevates the help request. As described above, elevating the help request passes the request and associated information to someone else. The process then returns to block 650, where the process determines whether the new advisor, to whom the help request was elevated, h as an answer.

If an answer was found at block 650 or 660, the process continues to block 670. At block 670, the answer is posted to the customer. For one embodiment, the answer may be posted as a separate document, a posting directly associated with the we b site, or in some other way. The answer may include text, video, audio or other display technology indicating an answer to the customer's help query.

At block 680, the process determines whether the answer exists in the database. For one embodiment, if the advisor knew the answer, and did not find it in the database, the answer may be new to the system. If the answer is found in the database, the process continues to block 685.

At block 685, the information from the customer is added to the existing answer. For one embodiment, the information may include the customer's web tracks, meta-tags, information associated with the help query, as well as the help query itself. This allows the next advisor or customer looking for the answer to find it more easily.

If the answer was not found in the database, the process continues to block 690. At block 690, the answer and some associated information is added to the database. For one embodiment, the answer is added into a folder. For another embodiment, the associated information may include the customer's web tracks, meta-tags associated with the help query, as well as the help query itself. The customer has an answer accessible to the customer and available to advisors and/or customers through the database.

Figure 7:
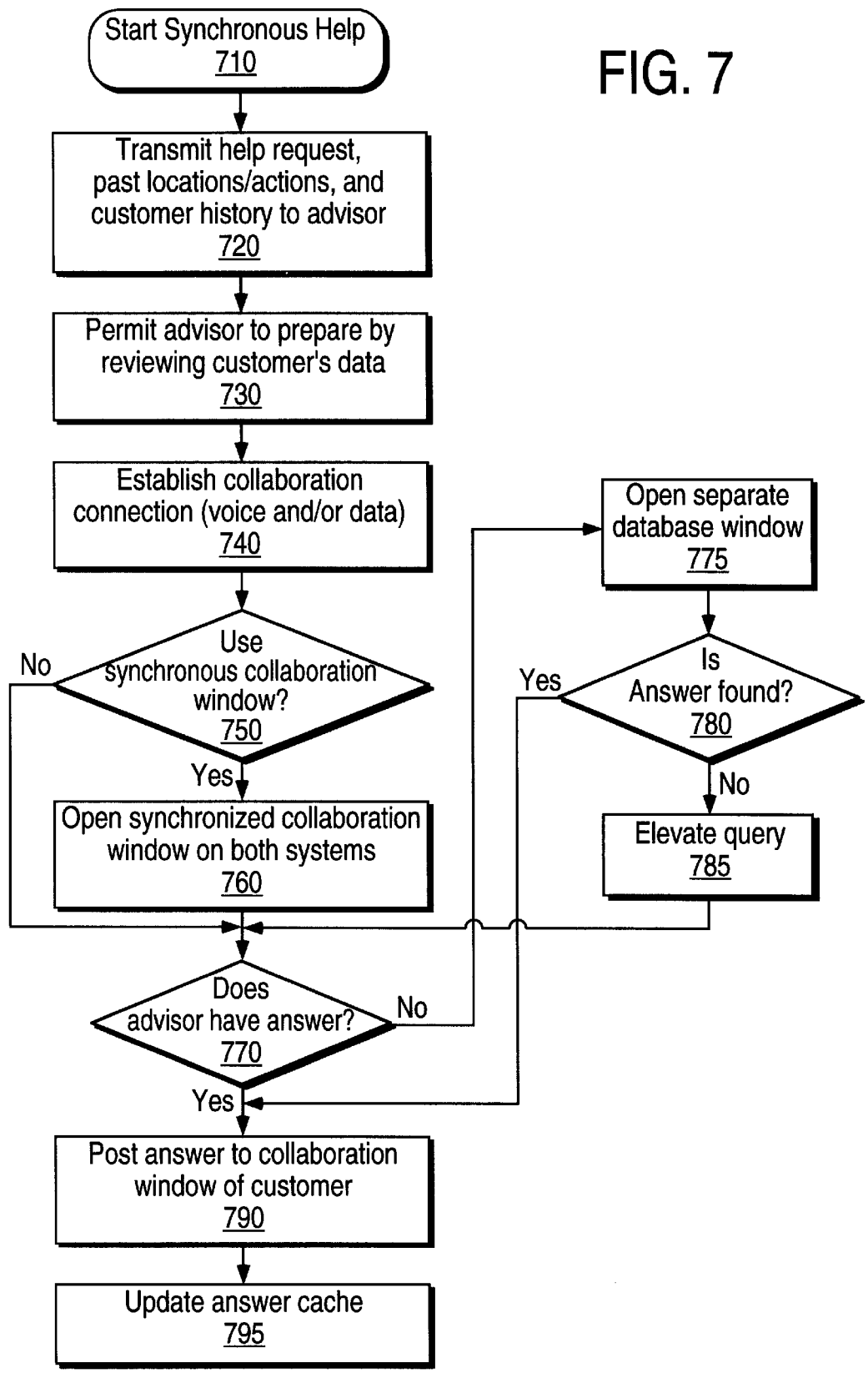
FIG. 7 illustrates one embodiment of a flow chart of synchronous help.

FIG. 7 illustrates the process of synchronous collaboration. At block 710, the synchronous collaboration is initiated. Synchronous collaboration provides almost instantaneous personal help to the customer. For one embodiment, the synchronous collaboration is initiated in response to a customer posting a high priority help request.

At block 710, the synchronous collaboration is initiated. For one embodiment, if the customer posted the help request through e-mail or telephone, the synchronous collaboration is initiated when an Internet connection is established between the customer and the agent.

At block 720, the help request, web tracks, and customer history is transmitted to the advisor that will handle this help request. For one embodiment, help requests are allocated to advisors on a time basis, i.e. the advisor that is not busy will receive the next help request. For another embodiment, help requests may be allocated based on the advisor's level of knowledge in the area of the help request. For another embodiment, the customer's history may influence what advisor receives the help request.

At block 730, the advisor is permitted to prepare by reviewing the customer's data. This informs the advisor of the question the customer has, as well as prior interactions between the help system and the customer.

At block 740, a collaboration connection is established between the advisor and the customer. For one embodiment, the advisor presses a button indicating that the advisor is ready to collaborate with the customer. For one embodiment, this establishes a network link between the customer and the advisor. For anther embodiment, the advisor may also establish a voice link with the customer.

At block 750, the advisor may decide to open a synchronized collaboration window, so that the display for the advisor and the customer is identical. This may be helpful to clarify the problem and/or answer. For one embodiment, this step may be left out. For another embodiment, the advisor may decide to establish the window or not establish the window based on the type of question asked by the customer. For another embodiment, the customer may refuse the establishment of the synchronized collaboration window. If the customer refuses to establish the window, the process continues directly to block 770. If the customer does not refuse the establishment of a synchronized window, the process continues to block 760.

At block 760, a synchronized collaboration window is opened on both systems. This window allows an identical display, permitting closer interaction between the customer and the advisor. Furthermore, for one embodiment, the synchronous collaboration window allows the advisor to the same display as the customer even if the customer's question comes from a personalized web page.

At block 770, the process determines whether the advisor has an answer to the customer's query. If the advisor has an answer, the process continues to block 790. If the advisor does not have an answer, the process continues to block 775.

At block 775, a database window is opened. For one embodiment, the database window is a separate window from the collaboration window, and the synchronous collaboration window. For one embodiment, the database window is invisible to the customer. For another embodiment, the database window is visible to the customer. The advisor then searches the database.

At block 780, the process determines whether the advisor has found an answer in the database. If the advisor has found an answer, the process returns to block 790. If the advisor did not find an answer, the process continues to block 785. At block 785, the help request is elevated. For one embodiment, the customer is informed of this elevation, and the customer further interacts with the new advisor who receives the elevated request. For another embodiment, the customer remains with the original advisor, and is not informed of the elevation of the request. Once the request is elevated, the process returns to block 770, determining whether the advisor to whom the request was elevated has an answer.

If an answer was found at block 770 or block 780, the process continued to block 790. At block 790, the answer is posted to the collaboration window of the customer. For one embodiment, the collaboration window is a synchronous collaboration window displaying web pages synchronously to the customer and the advisor. For another embodiment, the collaboration window may be a separate window that allows interaction between the customer and the advisor without a synchronous display. The posting may include text, audio, video, and/or any other type of data to answer the customer's question.

At block 795, the database is updated. The answer may be added to the database, if it was not found in the database. Alternatively, the information associated with the specific customer's question and web tracks may be added to the answer if the answer was found in the database.

This synchronous collaboration provides immediate answers to the customers' high priority questions. In addition, the postings are persistent, and remain associated with the specific page and help query to which they correspond. Each of these types of collaboration also builds a more elaborate database with each request.

FIG. 8 illustrates one embodiment of slider bars that may be used to change answers displayed to the customer. These slider bars may be used to select a number of things. For example, the slider bars may determine the similarity between the web tracks of a previous answer in the database and the current query. The less specificity is requested, the more answers may correspond to the help query. The slider bars may also determine such things as the length of the answer requested, the complexity of the answer requested, the format of the answer requested, etc.

For another embodiment, in a search including multiple terms or previous locations, the importance of each of those terms or previous locations may be individually adjusted. Thus, for example, if the customer has visited six previous locations before asking the question, more importance may be attached to one particular previous page during the search.

For one embodiment, these slider bars are adjusted during initial searching. For another embodiment, these slider bars may be moved to refine a search during the search process, based on the types of answers retrieved from the initial search.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for processing a client help request, said method comprising:
   responding to a help request from a client
   when said client makes a synchronous help request, alerting at least one responding advisor;
   receiving a response from said at least one responding advisor;
   synchronizing the display between said client and said at least one responding advisor; and
   permitting said at least one responding advisor to control a client browser.

2. The method according to claim 1, further comprising:
   displaying a menu of help request options including at least one of a synchronous help request option, an asynchronous help request option, and a self-help option.

3. The method according to claim 1, wherein said synchronizing the display comprises:
   having the advisor display include an identical display to that of the client.

4. The method according to claim 3, wherein said identical display to that of the client is displayed at a same rate for the advisor as for the client.

5. The method according to claim 1, wherein the advisor further has one of an additional display and an additional portion of one display permitting search of a database of information to help the client.

6. The method according to claim 1, further comprising:
   creating a reviewable discussion trail based on the client's discussion with the advisor.

7. The method according to claim 6, wherein said discussion trail is stored on a server, and may be reviewed by the client at any time.

8. The method according to claim 1, further comprising:

adding a help information generated by the advisor to the database of information accessible to clients.

9. The method according to claim 1, wherein when said client makes an asynchronous hell request, the method further comprises:

prompting the client to enter a help question;

forwarding the help question to the advisor;

waiting for the advisor to generate an answer to the help question; and returning the answer to the client.

10. The method according to claim 9, wherein the answer returned to the client comprises at least one of a web page hyperlink and a posting to a web page with hints that may include one or more of the following:

a video of the advisor explaining the answer; and an audio recording of the hints, and visual images.

11. The method according to claim 1, wherein said alerting at least one responding advisor includes using pattern matching with a database to determine which advisor is alerted.

12. The method according to claim 11, wherein the pattern matching includes client and profile information.

13. A method for processing a client help request, said method comprising:

classifying the help request as one of a synchronous help request and an asynchronous help request;

when synchronous help is requested, alerting at least one advisor, said at least one advisor conversing with the client over a link to deduce a problem;

permitting said at least one advisor to synchronize displays with the client and control the client browser;

generating an answer to the problem;

associating the answer with the client, such that the client can retrieve the answer; and providing at least one of a hyper-linked web page, a posting to a web page, and a persistent answer to a client system.

14. The method according to claim 13, further comprising:

dynamically injecting a help button into web pages displayed to the client system;

permitting the client system to request help from a first web page by pushing the help button;

associating said persistent answer with the first web page; and displaying said persistent answer whenever the client system accesses the first web page.

15. The method according to claim 14, wherein the persistent answer is stored on a server system.

16. The method according to claim 13, further comprising:

searching a predictive answer system for a response to the help request, wherein the predictive answer system uses pattern matching with a database to determine whether the response is applicable.

17. The method according to claim 16, wherein the pattern includes client profile and context information.

18. The method according to claim 17, wherein the context information comprises at least one of previous web page locations visited by the client and actions on the previous web page locations.

19. The method according to claim 13, wherein said advisor is one of an artificial intelligence, a client and a customer service representative.

* * * * *

UNITED STATES PATENT AND TRADEMARK OFFICE
CERTIFICATE OF CORRECTION

PATENT NO. : 6,177,932 C1  
APPLICATION NO. : 90/009057  
DATED : September 14, 2010  
INVENTOR(S) : Frank A. Galdes and Mark A. Ericson Page 1 of 1

It is certified that error appears in the above-identified patent and that said Letters Patent is hereby corrected as shown below:

Replace the claim 27 language in column 3, line 18 "The method of claim 23" with the language --The method of claim 26--

Replace the claim 51 language in column 35, line 17 "The method of claim 49" with the language --The method of claim 50--

Signed and Sealed this  
Twelfth Day of July, 2011

David J. Kappos  
*Director of the United States Patent and Trademark Office*

(12) EX PARTE REEXAMINATION CERTIFICATE (7732nd)
United States Patent
Galdes et al.

(10) Number: US 6,177,932 C1
(45) Certificate Issued: Sep. 14, 2010

(54) METHOD AND APPARATUS FOR NETWORK BASED CUSTOMER SERVICE

(75) Inventors: Frank A. Galdes, Menlo Park, CA (US); Mark A. Ericson, Redwood City, CA (US)

(73) Assignee: Gemini IP, LLC, Marshall, TX (US)

Reexamination Request:
No. 90/009,057, Feb. 27, 2008

Reexamination Certificate for:
Patent No.: 6,177,932
Issued: Jan. 23, 2001
Appl. No.: 09/137,989
Filed: Aug. 21, 1998

(51) Int. Cl.
*G06F 17/30* (2006.01)

(52) U.S. Cl. .............. 715/733; 705/1; 707/E17.111; 707/200

(58) Field of Classification Search .............. None
See application file for complete search history.

(56) References Cited

U.S. PATENT DOCUMENTS

| | | | |
|---|---|---|---|
| 5,241,625 A | 8/1993 | Epard et al. | |
| 5,563,805 A | 10/1996 | Arbuckle et al. | |
| 5,796,393 A | 8/1998 | MacNaughton et al. | |
| 5,838,682 A | 11/1998 | Dekelbaum et al. | |
| 5,862,330 A | 1/1999 | Anupam et al. | |
| 5,884,032 A | 3/1999 | Bateman et al. | |
| 5,907,547 A | 5/1999 | Foladare et al. | |
| 5,909,545 A | 6/1999 | Frese, II et al. | |
| 5,950,214 A | 9/1999 | Rivette et al. | |
| 5,956,691 A * | 9/1999 | Powers ..................... | 705/4 |
| 5,983,369 A | 11/1999 | Bakoglu et al. | |
| 5,991,810 A * | 11/1999 | Shapiro et al. ............. | 709/229 |
| 6,070,185 A | 5/2000 | Anupam et al. | |
| 6,144,991 A | 11/2000 | England | |
| 6,199,096 B1 | 3/2001 | Mirashrafi et al. | |
| 6,230,287 B1 | 5/2001 | Pinard et al. | |
| 6,240,444 B1 | 5/2001 | Fin et al. | |
| 6,256,620 B1 | 7/2001 | Jawahar et al. | |
| 6,289,333 B1 | 9/2001 | Jawahar et al. | |
| 6,295,551 B1 | 9/2001 | Roberts et al. | |
| 6,381,645 B1 | 4/2002 | Sassin | |
| 6,385,646 B1 | 5/2002 | Brown et al. | |
| 6,493,447 B1 | 12/2002 | Goss et al. | |
| 6,785,708 B1 | 8/2004 | Busey et al. | |

OTHER PUBLICATIONS

Lieberman, "Leitzia: An Agent That Assists Web Browsing", International Joint Conference on Artificial Intelligence, 1995.*
A. R. Ahuja et al., "The Rapport Multimedia Conferencing System" 1988. In: Robert Allen, ed. "Conference on Office Information Systems" SIGOIS Bulletin, vol. 9, Nos. 2 & 3, IEEE Catalog No. 88CH2582–5 (pp. 1–8).
Lauwers & Lantz, "Collaboration Awareness In Support Of Collaboration Transparency: Requirements For The Next Generation Of Shared Window Systems" in Empowering People, 1990 Chicago Conference Proceedings, Addison–Wesley ISBN: 0–201–50932–6 (pp. 303–311).
Sarin et al. "Computer–Based Real–Time Conferencing Systems" Computer Multimedia Communications. IEEE, Oct. 1985 (pp. 33–45).

* cited by examiner

Primary Examiner—Alexander J Kosowski

(57) ABSTRACT

A method and apparatus for a network based customer service is provided. In response to a client requesting help, a menu including three levels of interaction is displayed. One level of interaction is self-help searching in a database of information. A second level of interaction is asynchronous help, requesting help and receiving a reply. The third level of interaction is synchronous help, interaction with an advisor. If the client selects synchronous help, the method includes the steps of alerting the advisor and displaying a list of previously visited sites by the client to the advisor. The synchronous help method further includes providing a synchronized display between the client and the advisor, such that the advisor sees an identical display to the client.

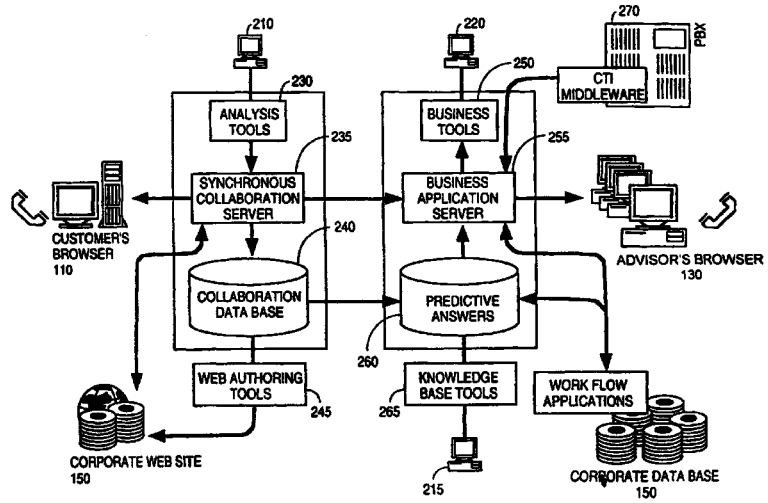

US 6,177,932 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the
patent, but has been deleted and is no longer a part of the
patent; matter printed in italics indicates additions made
to the patent.

ONLY THOSE PARAGRAPHS OF THE
SPECIFICATION AFFECTED BY AMENDMENT
ARE PRINTED HEREIN.

Column 3, lines 30-35:

The collaboration unit 300 further includes a workflow controller 325. The workflow controller 325 controls what cases are routed to each advisor. The workflow controller 325 also tracks the actions of the advisor and opens *or* closes cases. For one embodiment, the workflow controller 325 is a single system that controls workflow to all of the advisors.

Column 4, lines 24-37:

The database unit 360 includes a database 370 that is searched by the search system 350. The database 370 includes past postings and contexts. The database 370 may further include a help file, [a] frequently asked questions (FAQ), or other data. The database unit 360 may further include a purge unit 380. The purge unit 380 may purge data in the data unit 370 if the data was not used for a long time. For one embodiment, if a [datrem] *data* in the database 370 is not accessed for a period of time, it is purged. For example, the data may include an expiration date that is refreshed every time an access to the data is made. In this way, unused data is purged. For another embodiment, the purge unit 380 purges data relating to pages that are no longer available.

Column 7, lines 56-61:

At block 650, the process tests whether the advisor has an answer for the customer's request. The advisor may have more experience than the customer, and may be able to obtain an answer without searching. If the *advisor* has an answer, the process continues to block 670, otherwise, the process continues to block 655.

Column 8, lines 5-12:

If an answer was found, the process continues to block 670. If no answer was found, the process continues to block 665. At block 665, the advisor elevates the help request. As described above, elevating the help request passes the request and associated information to someone else. The process then returns to block 650, where the process determines whether the new advisor, to whom the help request was elevated, [h as] *has* an answer.

Column 8, lines 13-19:

If an answer was found at block 650 or 660, the process continues to block 670. At block 670, the answer is posted to the customer. For one embodiment, the answer may be posted as a separate document, a posting directly associated with the [we b] *web* site, or in some other way. The answer may include text, video, audio or other display technology indicating an answer to the customer's help query.

Column 8, line 64 to column 9, line 3:

At block 740, a collaboration connection is established between the advisor and the customer. For one embodiment, the advisor presses a button indicating that the advisor is ready to collaborate with the customer. For one embodiment, this establishes a network link between the customer and the advisor. For [anther] *another* embodiment, the advisor may also establish a voice link with the customer.

AS A RESULT OF REEXAMINATION, IT HAS BEEN DETERMINED THAT:

The patentability of claims 14-18 is confirmed.

Claims 1-9, 11-13 and 19 are cancelled.

Claim 10 is determined to be patentable as amended.

New claims 20-64 are added and determined to be patentable.

10. [The] *A* method [according to claim 9.] *for processing a client help request, said method comprising:*
   *responding to a help request from a client;*
   *when said client makes a synchronous help request, alerting at least one responding advisor;*
   *receiving a response from said at least one responding advisor;*
   *synchronizing the display between said client and said at least one responding advisor; and*
   *permitting said at least one responding advisor to control a client browser,*
   *wherein when said client makes an asynchronous help request, the method further comprises:*
   *prompting the client to enter a help question;*
   *forwarding the help question to the advisor;*
   *waiting for the advisor to generate an answer to the help question; and*
   *returning the answer to the client, and*
   wherein the answer returned to the client comprises at least one of a web page hyperlink and a posting to a web page with hints that may include one or more of the following:
   a video of the advisor explaining the answer; and
   an audio recording of the hints, and visual images.

20. *The method of claim 13, further comprising classifying the help request as the asynchronous help request when the client posts a medium priority help request and classifying the help request as the synchronous help request when the client posts a high priority help request or when the client posts the help request via electronic mail or telephone and an internet connection is established between the client and the at least one advisor.*

21. *A method for processing a client help request, said method comprising:*
   *responding to a help request from a client;*
   *when said client makes a synchronous help request, alerting at least one responding advisor;*
   *receiving a response from said at least one responding advisor;*
   *synchronizing the display between said client and said at least one responding advisor; and*
   *permitting said at least one responding advisor to control a client browser,*
   *wherein the at least one responding advisor responds through a collaboration unit,*
   *wherein the collaboration unit comprises a workflow controller configured to control what cases are routed to each advisor of the at least one responding advisor, and* wherein the workflow controller is configured to track actions of the at least one responding advisor, to open a help request and to close a help request.

22. The method of claim 21, wherein when a new case is opened by the workflow controller, a context grabbing unit collects context information from a client's system to aid the at least one responding advisor in helping the client.

23. The method of claim 22, wherein the context information comprises web tracks of the client.

24. The method of claim 23, wherein the web tracks comprise web site locations that the client visited prior to asking for help.

25. The method of claim 24, wherein the web tracks comprise actions of the client at the web site locations that the client visited prior to asking for help.

26. The method of claim 22, wherein the context information comprises client history.

27. The method of claim 23, wherein the client history comprises previous questions asked by the client and personal information of the client.

28. A method for processing a client help request, said method comprising:
  responding to a help request from a client;
  when said client makes a synchronous help request, alerting at least one responding advisor;
  receiving a response from said at least one responding advisor;
  synchronizing the display between said client and said at least one responding advisor; and
  permitting said at least one responding advisor to control a client browser,
  wherein the at least one responding advisor responds through a collaboration unit,
  wherein the collaboration unit comprises a communication channel,
  wherein the collaboration unit comprises a synchronization unit,
  wherein the collaboration unit further comprises a search system configured to permit the at least one responding advisor to search a database in a database unit to answer any questions from the client, and
  wherein if the at least one responding advisor does not know the answer to the client's questions, the search system is automatically engaged to find an answer.

29. The method of claim 28, wherein if the answer is not found, an elevation unit is provided, the elevation unit elevating the help request from the client.

30. The method of claim 29, further comprising the elevation unit collecting context information gathered by a context grabbing unit and information from a collaborative session collected by a workflow controller, and then passing the context information and the information from the collaborative session to another advisor.

31. The method of claim 30, wherein the another advisor comprises one of, a manager or a technical specialist.

32. A method for processing a client help request, said method comprising:
  responding to a help request from a client;
  when said client makes a synchronous help request, alerting at least one responding advisor;
  receiving a response from said at least one responding advisor;
  synchronizing the display between said client and said at least one responding advisor;
  permitting said at least one responding advisor to control a client browser; and
  providing a post generator if an answer is found to the help request from the client, the posting generator allowing the at least one responding advisor to place a posting to a web page that was discussed with the client,
  wherein the posting is associated with a specific web page for the client.

33. The method of claim 32, wherein the posting is persistent and appears on the specific web page every time the client opens the specific web page or until the client closes the posting.

34. The method of claim 32, wherein the posting is stored in a database not belonging to the client.

35. A method for processing a client help request, said method comprising:
  responding to a help request from a client;
  when said client makes a synchronous help request, alerting at least one responding advisor;
  receiving a response from said at least one responding advisor;
  synchronizing the display between said client and said at least one responding advisor;
  permitting said at least one responding advisor to control a client browser; and
  testing whether the client is using a thin client or a thick client,
  wherein the thick client comprises a system that automatically collects all relevant information from the client or the help request if it was received through an electronic mail or a telephone, and the thin client comprises a system that collects the client's identity.

36. The method of claim 35, further comprising collecting context information if the client is using a thin client.

37. The method of claim 35, further comprising querying to determine the priority of a response.

38. The method of claim 37, further comprising the client indicating a number or type of priority, the type of priority being one of, low priority, medium priority or high priority.

39. The method of claim 38, further comprising initiating a self-service lookup if the type of priority is low priority.

40. The method of claim 38, further comprising initiating an asynchronous collaboration if the type of priority is medium priority.

41. The method of claim 38, further comprising initiating a synchronous collaboration if the type of priority is high priority.

42. The method of claim 39, further comprising testing whether the client has selected a search basis wherein the search basis comprises at least one of 1) keyword or text search, 2) context or a current location from which help was requested, 3) structured search or searching through a tree, or 4) any combination thereof.

43. The method of claim 42, further comprising displaying a search data entry block to allow the client to type in a search if the search basis is a keyword or text search.

44. The method of claim 43, further comprising providing the client search capabilities for at least one of, a boolean search, natural language or English language search, or any combination thereof.

45. The method of claim 42, further comprising displaying postings relating to a current web page from which the client requested help if the search basis is a current location from which help was requested.

46. The method of claim 45, further comprising displaying the postings with headers to indicate the topic of the postings and allowing the client to select postings that are relevant to the client's questions.

47. The method of claim 42, further comprising obtaining web tracks if the search basis is a context search basis, wherein the web tracks comprise at least one of, past locations or web pages the client visited prior to requesting help, actions of the client at each of the past locations, or any combination thereof.

48. The method of claim 44, further comprising allowing the client to select how closely the context, text, or page location of the client has to match the data associated with the posting to be displayed.

49. The method of claim 48, further comprising displaying hierarchical folders with headers indicating the type of postings included in each folders.

50. The method of claim 49, further comprising allowing the client to narrow or broaden a search by using slide selection bars.

51. The method of claim 49, further comprising determining if an answer is found to the help request from the client.

52. The method of claim 51, further comprising the client indicating that the answer is found by activating an answer-found button if the answer is found.

53. The method of claim 42, further comprising the client executing a new search or changing the search basis if the answer is not found.

54. The method of claim 51, further comprising the client changing the type of priority if the answer is not found.

55. The method of claim 54, further comprising changing the type of priority from low priority to medium priority or high priority, wherein the low priority is a self-service look up, the medium priority is an asynchronous collaboration, and the high priority is a synchronous collaboration.

56. The method of claim 52, further comprising the client creating a posting associated with a web page to clarify that an answer was found or what the answer is.

57. The method of claim 56, further comprising making the posting persistent and remaining associated with the web page for the client.

58. The method of claim 56, further comprising adding to the posting at least one of, the client's web tracks, the client's search text, or any combination thereof.

59. The method of claim 42, further comprising automatically selecting a context search basis and automatically determining and pushing an answer to the client by an electronic agent.

60. A method for processing a client help request, said method comprising:
classifying the help request as one of a synchronous help request and an asynchronous help request;
when synchronous help is requested, alerting at least one advisor, said at least one advisor conversing with the client over a link to deduce a problem;
permitting said at least one advisor to synchronize displays with the client and control the client browser;
generating an answer to the problem;
associating the answer with the client, such that the client can retrieve the answer;
providing at least one of a hyper-linked web page, a posting to a web page, and a persistent answer to a client system, wherein the synchronizing of displays comprises the at least one advisor establishing a synchronized collaboration window that allows the at least one advisor to the same identical display of the client even if the client's question for help request comes from a personalized web page;
the at least one advisor opening a database window that is a separate window from the synchronized collaboration window, to search a database if the at least one advisor does not have an answer to the client's question for the help request; and
elevating the help request and the client interacting with a new advisor who receives the elevated request if the at least one advisor does not have an answer to the client's question for the help request.

61. A method for processing a client help request, said method comprising:
classifying the help request as one of a synchronous help request and an asynchronous help request;
when synchronous help is requested, alerting at least one advisor, said at least one advisor conversing with the client over a link to deduce a problem;
permitting said at least one advisor to synchronize displays with the client and control the client browser;
generating an answer to the problem;
associating the answer with the client, such that the client can retrieve the answer;
providing at least one of a hyper-linked web page, a posting to a web page, and a persistent answer to a client system, wherein the synchronizing of displays comprises the at least one advisor establishing a synchronized collaboration window that allows the at least one advisor to the same identical display of the client even if the client's question for the help request comes from a personalized web page;
the at least one advisor opening a database window that is a separate window from the synchronized collaboration window, to search a database if the at least one advisor does not have an answer to the client's question for the help request; and
adding the answer to the database if the answer was not found in the database.

62. A method for processing a client help request, said method comprising:
classifying the help request as one of a synchronous help request and an asynchronous help request;
when synchronous help is requested, alerting at least one advisor, said at least one advisor conversing with the client over a link to deduce a problem;
permitting said at least one advisor to synchronize displays with the client and control the client browser;
generating an answer to the problem;
associating the answer with the client, such that the client can retrieve the answer;
providing at least one of a hyper-linked web page, a posting to a web page, and a persistent answer to a client system, wherein the synchronizing of displays comprises the at least one advisor establishing a synchronized collaboration window that allows the at least one advisor to the same identical display of the client even if the client's question for the help request comes from a personalized web page;
the at least one advisor opening a database window that is a separate window from the synchronized collaboration window, to search a database if the at least one advisor does not have an answer to the client's question for the help request; and
adding information associated with a specific question of the client and web tracks of the client to the database if the answer was found in the database.

63. A method for processing a client help request, said method comprising:

classifying the help request as one of a synchronous help request and an asynchronous help request;
when synchronous help is requested, alerting at least one advisor, said at least one advisor conversing with the client over a link to deduce a problem;
permitting said at least one advisor to synchronize displays with the client and control the client browser;
generating an answer to the problem;
associating the answer with the client, such that the client can retrieve the answer;
providing at least one of a hyper-linked web page, a posting to a web page, and a persistent answer to a client system; and
the client using slide bars to change answers displayed to the client,
wherein the change of the answers displayed comprises at least one of, allowing the client to determine the similarity between web tracks of a previous answer found in a database and web tracks associated with the help request, allowing the client to determine the length of an answer to the help request, allowing the client to determine the complexity of an answer to the help request, allowing the client to determine the format of an answer to the help request, allowing the client to determine the importance of each term or each previous location of a web page in web tracks associated with the help request, or any combination thereof.

64. A method for processing a client help request, said method comprising:
classifying the help request as one of a synchronous help request and an asynchronous help request;
when synchronous help is requested, alerting at least one advisor, said at least one advisor conversing with the client over a link to deduce a problem;
permitting said at least one advisor to synchronize a display of the client and a display of the at least one advisor and to control the client browser;
searching a predictive answer system for a response to the help request, the predictive answer system using a pattern matching with a database to determine whether the response is applicable, the pattern comprising client profile and context information, the context information comprising at least one of previous web page locations visited by the client and actions on the previous web page locations;
generating an answer to the problem;
associating the answer with the client, such that the client can retreive the answer;
providing at least one of a hyper-linked web page, a posting to a web page, and a persistent answer to a client system; and
adding information from the client to a database with the answer, the information from the client comprising at least one of, the client's web tracks, meta-tags, information associated with the help request, the help request, or any combination thereof.

* * * * *